United States Patent [19]

Araki

[11] Patent Number: 4,847,744

[45] Date of Patent: Jul. 11, 1989

[54] VOLTAGE CONVERTER APPARATUS

[75] Inventor: Hiroshi Araki, Inazawa, Japan

[73] Assignee: Mitsubishi Denki Kabushiki Kaisha, Japan

[21] Appl. No.: 230,414

[22] Filed: Aug. 10, 1988

[30] Foreign Application Priority Data

Aug. 17, 1987 [JP] Japan .................................. 62-203795

[51] Int. Cl.$^4$ ........................ H02M 5/458; H02H 7/10
[52] U.S. Cl. ....................................... 363/49; 363/51; 363/87
[58] Field of Search ....................... 363/35, 37, 49, 51, 363/84, 85, 87; 323/901

[56] References Cited

U.S. PATENT DOCUMENTS

| 4,028,607 | 6/1977 | Watanabe | 363/51 |
| 4,188,663 | 2/1980 | Okawa et al. | 363/51 |
| 4,555,750 | 11/1985 | Matsumura et al. | 363/49 |
| 4,573,113 | 2/1986 | Bauman | 363/49 |
| 4,620,296 | 10/1986 | Siemon | 363/51 |

Primary Examiner—Peter S. Wong
Attorney, Agent, or Firm—Leydig, Voit & Mayer

[57] ABSTRACT

A power converter apparatus comprising an initial voltage-setting circuit by which a signal for generating a predetermined voltage on the alternating (A.C.) side of a converter is applied to a current negative-feedback circuit at the start of the converter.

7 Claims, 4 Drawing Sheets

VOLTAGE CONVERTER APPARATUS

BACKGROUND OF THE INVENTION

This invention relates to a power converter apparatus for converting A.C. power into D.C. power.

FIGS. 3-6 are diagrams showing a prior-art voltage converter apparatus disclosed in, for example, the official gazette of Japanese Patent Application Laid-open No. 194697/1984. FIG. 3 is the diagram of the main circuit of an A.C. elevator, FIG. 4 is the block diagram of a control circuit for a converter, FIG. 5 is the block diagram of a current controlling minor loop, and FIG. 6 is the diagram of voltage/current waveforms.

In FIG. 3, numeral 1 designates a three-phase A.C. power source, numeral 2 a converter which is constructed of transistors capable of forced commutation and diodes parallel thereto and which is connected to the A.C. power source 1 so as to convert A.C. power into D.C. power, numeral 3 a smoothing capacitor which is connected to the D.C. side of the converter 2 so as to smooth the D.C. power, numeral 4 a D.C. bus, and numeral 5 an inverter which is constructed similarly to the converter 2 and which is connected to the D.C. bus 4 so as to invert the D.C. power into A.C. power and to perform a variable-voltage and variable-frequency control. Shown at numeral 6 is an induction motor which is connected to the A.C. side of the inverter 5 so as to drive the elevator.

In a case where the motor 6 carries out power running, energy for driving the motor 6 is fed from the A.C. power source 1 through the converter 2 and the D.C. bus 4 to the inverter 5, and this inverter produces the A.C. power of variable voltage and variable frequency, which is supplied to the motor 6. Accordingly, the motor 6 is controlled to a torque and a revolution speed as desired and drives the cage (not shown) of the elevator.

On the other hand, in a case where the motor 6 carries out regenerative running, regenerative energy is fed to the converter 2 through the inverter 5 and the D.C. bus 4 by the function of the flywheel diodes of the inverter 5 and is given back to the A.C. power source 1 by the converter 2. That is, the A.C. power source 1 is regarded as an A.C. machine which rotates at a fixed frequency (here, the commercial frequency of the power source), in opposition to the D.C. voltage source, and the electric power is supplied to the A.C. power source 1 by the converter 2.

In FIG. 4, numeral 9 indicates an A.C. reactor which is inserted in each phase of the A.C. power source 1. Alternating-current detectors 10A-10C detect the currents of lines connecting the A.C. reactors 9 and the converter 2 and deliver alternating-current signals 10a-10c as outputs, respectively. A D.C. voltage detector 11 detects the voltage of the D.C. bus 4, and delivers a D.C. voltage signal 11a as an output. A voltage command value-setting unit 12 issues a D.C. voltage command value 12a, which is set at, for example, a value corresponding to the D.C. voltage of the D.C. bus 4 during the stop (no load) of the motor 6. Numeral 13 indicates a voltage-controlled amplifier, and symbol 13a the output thereof. A three-phase sinusoidal-wave generator 14 generates three-phase sinusoidal-wave reference signals 14a-14c which are synchronous to the A.C. power source 1. Symbols 15A-15C denote multiplier units, which produce respective outputs 15a-15c being three-phase sinusoidal-wave current command values.

Current-controlled amplifiers 16A-16C produce outputs 16a-16c, respectively. A saw-tooth wave generator 17 generates an output 17a being an output modulation signal. A comparator 18 produces outputs 18a-18f. A base drive circuit 19 for the transistors of the converter 2 produces outputs 19a-19f which are the switching signals of the transistors.

In FIG. 5, numeral 21 designates an adder. Numeral 22 indicates the transfer function of the current-controlled amplifiers 16A-16C, numeral 23 that of the comparator 18, and numeral 24 that of the converter 2. Shown at numeral 25 is an adder. Numeral 26 indicates the transfer function of the A.C. reactors 9, and numeral 27 that of the alternating-current detectors 10A-10C. Symbol $V_{2ac}$ denotes a voltage on the A.C. side of the converter 2, and symbol $I_{2ac}$ a current on the A.C. side thereof.

The prior-art voltage converter apparatus is constructed as described above. The D.C. voltage signal 11a corresponding to the voltage of the D.C. bus 4 is checked with the D.C. voltage command value 12a by the voltage-controlled amplifier 13, and the resulting deviation is delivered as the output 13a. Subsequently, the three-phase sinusoidal-wave reference signals 14a-14c are multiplied by the output 13a in the respective multiplier units 15A-15C. That is, the output 13a serves as a value which determines the amplitudes of the three-phase sinusoidal-wave reference signals 14a-14c. The three-phase sinusoidal-wave current command values 15a-15c and the corresponding alternating-current signals 10a-10c negatively fed back are respectively checked by the current-controlled amplifiers 16A-16C, and the resulting deviations are respectively issued as the outputs 16a-16c. The outputs 16a-16c are compared with the output modulation signal 17a by the comparator 18, whereupon the signal 18a-18f which determine the switching timings of the respective transistors of the converter 2 are output to operate the base drive circuit 19. Then, this base drive circuit applies the switching signals 19a-19f to the bases of the respective transistors so that the D.C. voltage of the smoothing capacitor 3 may equalize to the D.C. voltage command value 12a and that the currents may be controlled into the form of sinusoidal waves. That is, the converter 2 is controlled as a sinusoidal-wave pulse-width-modulation inverter of constant frequency.

FIG. 6 shows the voltage/current waveforms of one phase. In a case where the motor 6 has performed the power running until the D.C. voltage of the smoothing capacitor 3 has become lower than the D.C. voltage command value 12a, the current waveform becomes in phase with the sinusoidal waveform of the power source voltage so as to supply electric power from the A.C. power source 1 to the D.C. bus 4. In contrast, in a case where the motor 6 has performed the regenerative running until the D.C. voltage of the D.C. bus 4 has risen above the D.C. voltage command value 12a, the current waveform comes to have the opposite phase to the phase of the sinusoidal waveform of the power source voltage so as to regenerate electric power from the D.C. bus 4 to the A.C. power source 1.

Even in the sinusoidal-wave pulse-width-modulation control, a ripple component corresponding to a pulse-width-modulation frequency is contained in the current due to the saw-tooth wave voltage. However, the A.C. reactor 9 of comparatively great reactance is inserted in each phase of the A.C. power source 1, and it relieves the ripple so as to obtain a smooth sinusoidal current.

By the way, the voltage-controlled amplifier 13 is usually constructed of an integrator in order to improve the response of the control system.

With the prior-art voltage converter apparatus as stated above, when the voltage-controlled amplifier 13 of the A.C. voltage feedback circuit is constructed of the integrator, the output 13a thereof becomes null at the start of the converter 2 because the integrator needs to be reset at that time. Consequently, the three-phase sinusoidal-wave current command values 15a-15c become null. Since the current on the A.C. side of the converter 2 is null at the start thereof, the alternating-current signals 10a-10c become null. Therefore, the outputs 16a-16c of the current-controlled amplifiers 16A-16C become null, and the transistors are switched so as to render the voltage of the A.C. side of the converter 2 null. As a result, an inrush current expressed by $V_{ac}/(j\omega L)$ ($V_{ac}$: the voltage of the A.C. power source 1) flows on the A.C. side of the converter 2, to incur such a problem that the smoothing capacitor 3 and the voltage converter elements are destroyed due to the rise of the voltage of the D.C. bus 4.

SUMMARY OF THE INVENTION

This invention has been made in order to solve the aforementioned problem, and has for its object to provide a power converter apparatus which can prevent an inrush current at the start of a converter and which can stably control the voltage of a D.C. bus.

The power converter apparatus according to this invention comprises an initial voltage-setting circuit by which a signal for generating a predetermined voltage on the A.C. side of a converter is applied to a current negative-feedback circuit at the start of the converter.

In this invention, the predetermined voltage is generated on the A.C. side of the converter at the start thereof, so that the difference between the voltage of the A.C. side of the converter and the voltage of an A.C. power source becomes small, and a current on the A.C. side of the converter becomes low.

BRIEF DESCRIPTION OF THE DRAWINGS

FIGS. 1 and 2 are diagrams showing an embodiment of a power converter apparatus according to this invention, in which FIG. 1 is the block diagram of a control circuit for a converter, while FIG. 2 is the block diagram of a current controlling minor loop in FIG. 1; and FIGS. 3-6 are diagrams showing a power converter apparatus in a prior art, in which FIG. 3 is the diagram of the main circuit of an A.C. elevator, FIG. 4 is the block diagram of a control circuit for a converter in FIG. 3, FIG. 5 is the block diagram of a current controlling minor loop in FIG. 4, and FIG. 6 is the diagram of voltage/current waveforms.

Throughout the drawings, the same symbols indicate identical portions.

DESCRIPTION OF THE PREFERRED EMBODIMENT

Figure 1:
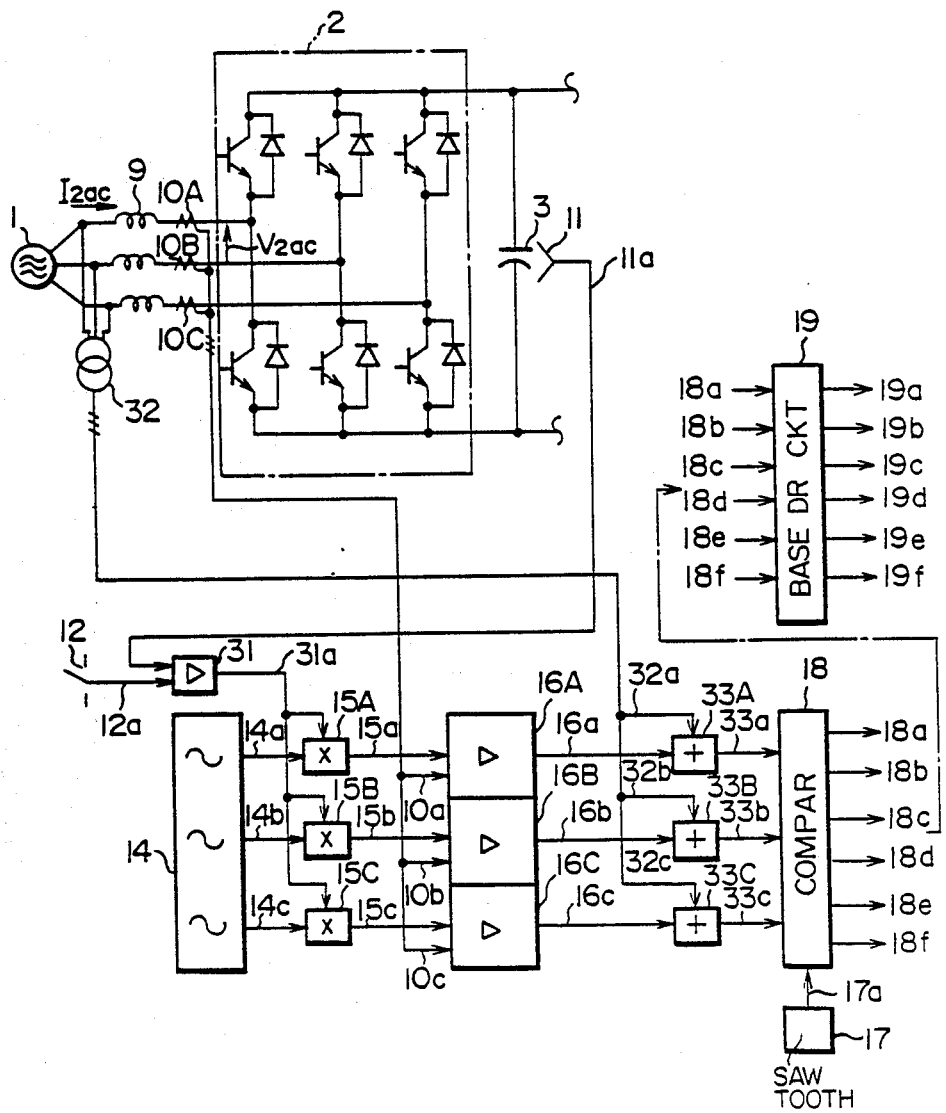
Figure 2:
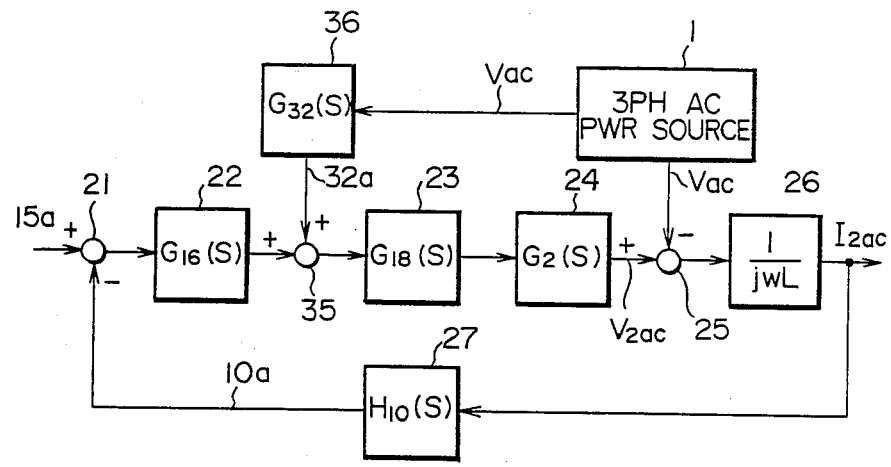
Figure 3:
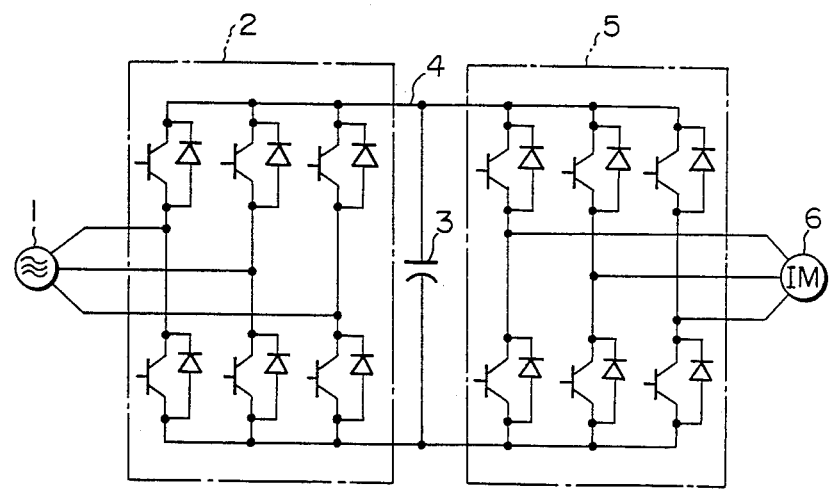
Figure 4:
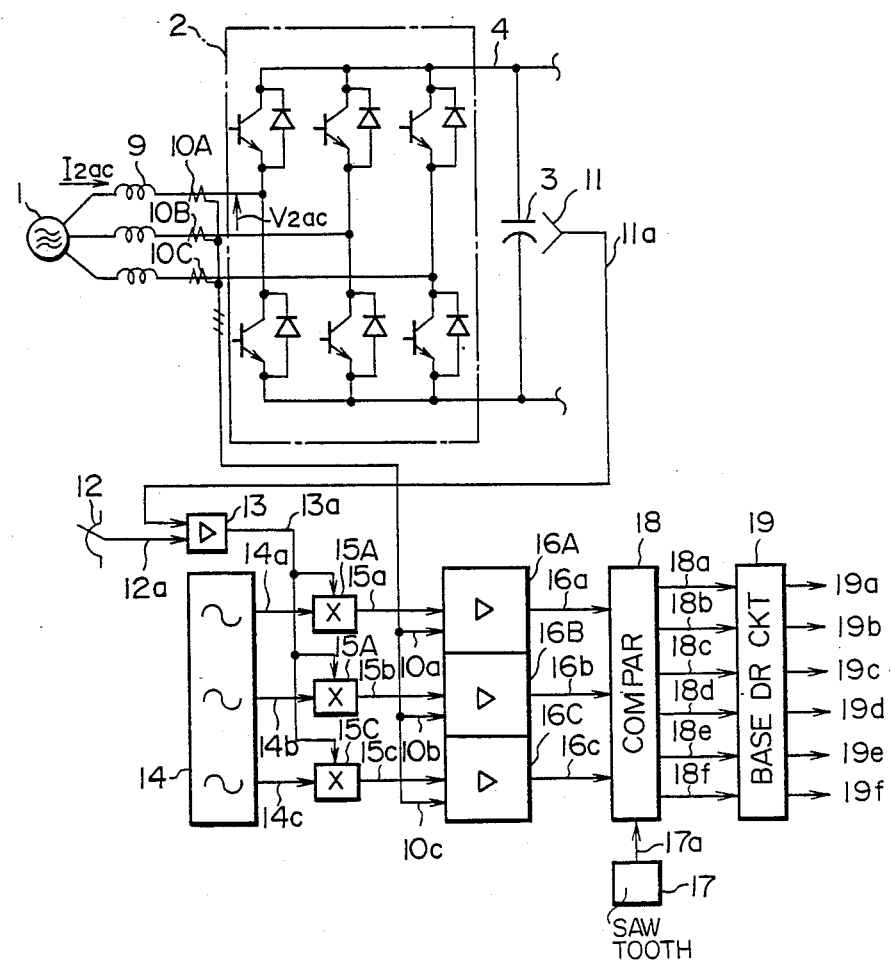
Figure 5:
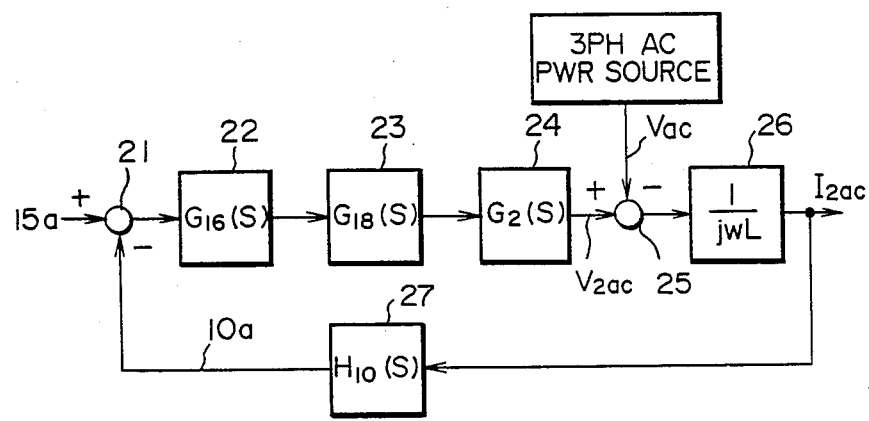
Figure 6:

FIGS. 1 and 2 are diagrams showing an embodiment of this invention, in which FIG. 1 is the block diagram of a control circuit for a converter, while FIG. 2 is the block diagram of a current controlling minor loop, and in which the same portions as in the prior-art apparatus are indicated by identical symbols.

In FIG. 1, numeral 31 designates a voltage-controlled amplifier which is contructed of an integrator and which produces an output 31a. An A.C. voltage detector 32 is connected to an A.C. power source 1 and detects A.C. voltages, which are delivered as outputs 32a-32c. Adders 33A-33C produce outputs 33a-33c, respectively.

In FIG. 2, numeral 35 indicates an adder, and numeral 36 the transfer function of the A.C. voltage detector 32.

Next, the operation of this embodiment will be described.

The voltage-controlled amplifier 31 is reset during the stop of a converter 2, and the reset of the voltage-controlled amplifier 31 is released simultaneously with the start of the converter 2. Since the output 31a of the voltage-controlled amplifier 31 is null immediately before the start, three-phase sinusoidal-wave current command values 15a-15c are null. In addition, since the current $I_{2ac}$ of the A.C. side of the converter 2 is null, the outputs 16a-16c of current-controlled amplifiers 16A-16C become null. Since, however, the outputs 32a-32c of the A.C. voltage detector 32 are added by the respective adders 33A-33C, the outputs 33a-33c of these adders 33A-33C equalize to the corresponding outputs 32a-32c of the A.C. voltage detector 32, respectively. Accordingly, the voltage $V_{2ac}$ of the A.C. side of the converter 2 becomes a voltage equal to the voltage $V_{ac}$ of the power source 1 through the transfer function 23 of a comparator 18 and the transfer function 24 of the converter 2. As a result, when the converter 2 is started, the potential difference between the primary side and secondary side of each A.C. reactor 9 vanishes, and current flowing through the A.C. reactor 9 becomes null. That is, when the converter 2 is started, the current $I_{2ac}$ of the A.C. side thereof is null. Thereafter, the converter 2 is controlled so that currents corresponding to the three-phase sinusoidal-wave current command values 15a-15c may flow.

As described above, in this invention, an initial voltage-setting circuit which generates a predetermined voltage on the A.C. side of a converter is disposed. Therefore, the invention brings forth the effect that an inrush current from an A.C. power source can be prevented at the start of the converter, to avoid the destruction of a smoothing capacitor, power converter elements, etc. and to provide an apparatus of low cost and high precision.

What is claimed is:
1. A voltage converter apparatus comprising:
a converter which converts alternating current (A.C.) into direct account (D.C.) connected to an A.C. power source through an A.C. reactor;
a smoothing capacitor and an inverter which inverts the direct current into alternating current which are connected to supply the alternating current to an induction motor connected to a D.C. side of the converter;
a voltage negative-feedback circuit which controls a voltage on the D.C. side of the converter;
a current negative-feedback circuit which controls the current on an A.C. side of the converter; and
an initial voltage-setting circuit by which a signal for generating a predetermined voltage on the A.C. side of said converter is applied to said current negative-feedback circuit when said converter is started.

2. A voltage converter apparatus as defined in claim 1 wherein said predetermined voltage is set at a voltage which is equal to a voltage of said A.C. power source.

3. A voltage converter apparatus as defined in claim 1 wherein said voltage negative-feedback circuit includes an integrator.

4. A voltage converter apparatus comprising:
   a converter which converts alternating current (A.C.) power into direct current (D.C.) power having a D.C. voltage, the converter having an A.C. side and a D.C. side and being connected to an A.C. power source at the A.C. side through at least one A.C. reactor; and
   control means for receiving a D.C. voltage command value, for comparing the D.C. voltage command value with the D.C. voltage produced by the converter to detect deviations and produce a deviation signal, and for controlling the converter responsive to the deviations to produce a D.C. voltage equal to the D.C. voltage command value, the means including an initial voltage-setting circuit having an A.C. voltage detector connected to receive A.C. power from the A.C. power source and further connected to provide an A.C. voltage at the A.C. side of the converter, the A.C. voltage being equal to the A.C. power source voltage when the converter is started.

5. The voltage converter apparatus set forth in claim 4 wherein the control means includes:
   a D.C. voltage detector connected to detect the D.C. voltage produced by the converter; and
   a voltage controlled amplifier connected to receive the D.C. voltage command value and the D.C. voltage from the D.C. voltage detector and to produce a deviation signal in accordance with deviations between the D.C. voltage and the D.C. voltage command value.

6. The voltage converter apparatus set forth in claim 4 wherein the converter includes at least one transistor and the control means includes means for providing base drive to the transistor.

7. The voltage converter apparatus set forth in claim 6 wherein the means for providing base drive includes:
   a three-phase sinusoidal-wave generator which generates three-phase sinusoidal-waves;
   a multiplier connected to multiply the three-phase sinusoidal-waves by the deviation signal to produce three-phase sinusoidal-wave current command values;
   a current controlled amplifier connected to receive the three-phase sinusoidal-wave current command values and produce amplified current commands;
   an adder connected to add the amplified current commands to A.C. power received from the A.C. voltage detector and to produce a sum;
   a saw-tooth wave generator which produces an output modulation signal;
   a comparator connected to receive the sum and the output modulation signal and to produce switching timing signals; and
   a base drive circuit connected to receive the switching timing signals and to provide base drive to the transistor in accordance with the switching timing signals.

\* \* \* \* \*